(12) United States Patent
Timmer et al.

(10) Patent No.: US 8,236,723 B2
(45) Date of Patent: Aug. 7, 2012

(54) SELECTIVE CATALYSTS FOR NAPHTHA HYDRODESULFURIZATION

(75) Inventors: Sven Johan Timmer, Leiderdorp (NL); Jason Wu, Clinton, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 137 days.

(21) Appl. No.: 12/087,982

(22) PCT Filed: Jan. 16, 2007

(86) PCT No.: PCT/US2007/001063
§ 371 (c)(1),
(2), (4) Date: Oct. 20, 2009

(87) PCT Pub. No.: WO2007/084471
PCT Pub. Date: Jul. 26, 2007

(65) Prior Publication Data
US 2010/0133148 A1    Jun. 3, 2010

(51) Int. Cl.
*B01J 31/34* (2006.01)
*B01J 21/08* (2006.01)
*C10G 45/08* (2006.01)

(52) U.S. Cl. ........ 502/150; 502/167; 502/172; 502/255; 502/260; 208/243; 208/244; 208/245

(58) Field of Classification Search .......... 208/209, 208/213, 216 R, 216 PP, 217, 243, 244, 245; 502/150, 151, 158, 167, 172, 240, 254, 255, 502/258, 260
See application file for complete search history.

(56) References Cited

U.S. PATENT DOCUMENTS

| | | | |
|---|---|---|---|
| 4,132,632 A | 1/1979 | Yu et al. | |
| 5,985,136 A | 11/1999 | Brignac et al. | |
| 6,013,598 A | 1/2000 | Lapinski et al. | |
| 6,280,610 B1 * | 8/2001 | Uragami et al. | 208/216 R |
| 6,602,405 B2 | 8/2003 | Pradhan et al. | |
| 2002/0010086 A1 * | 1/2002 | Plantenga et al. | 502/167 |
| 2003/0173256 A1 | 9/2003 | Fujikawa et al. | |
| 2004/0055936 A1 * | 3/2004 | Diehl et al. | 208/216 R |
| 2005/0139520 A1 | 6/2005 | Bhan et al. | |
| 2006/0000751 A1 | 1/2006 | Bouchy et al. | |

FOREIGN PATENT DOCUMENTS

| | | |
|---|---|---|
| EP | 0 067 459 A1 | 12/1982 |
| EP | 0 181 035 * | 5/1986 |
| EP | 0 181 035 A2 | 5/1986 |
| GB | 950 952 | 3/1964 |
| GB | 1334606 | 10/1973 |
| GB | 2 189 163 A | 10/1987 |
| WO | 96/41848 | 12/1996 |

OTHER PUBLICATIONS

Hiroshima, Kazutaka, Mochizuki, Takeo, Honma, Takehide, Shimizu, Takehiro, Yamada, Muneyoshi, "High HDS activity of Co-Mo/Al2O3 modified by some chelates and their surface fine structures", Applied Surface Science 121/122 (1997) pp. 433-436.

de Jong, Arthur M., de Beer, V.H.J. (San), van Veen, J.A. Rob, Niemantsverdriet, J.W. (Hans), "Surface Science Model of a Working Cobalt-Promoted Molybdenum Sulfide Hydrodesulfurization Catalyst: Characterization and Reactivity", Journal of Physical Chemistry 1996, 100, pp. 17722-17724.

Cattaneo, et al., The Relationship Between the Structure of NiMo/SiO2 Catalyst Precursors Prepared in the Presence of Chelating Ligands and the Hydrodesulfurization Activity of the Final Sulfided Catalysts, Journal of Catalysis 185, pp. 199-212, 1999.

* cited by examiner

*Primary Examiner* — Walter D Griffin
*Assistant Examiner* — Renee E Robinson
(74) *Attorney, Agent, or Firm* — Bruce M. Bordelon (57) ABSTRACT

The invention relates to a catalyst for hydrodesulfurizing naphtha, to a method for preparing said catalyst and to a method for hydrodesulfurizing naphtha using said catalyst. More particularly, the catalyst comprises a Co/Mo metal hydrogenation component on a silica support having a defined pore size distribution and at least one organic additive. The catalyst has high dehydrosulphurisation activity and minimal olefin saturation when used to hydrodesulfurize FCC naphtha.

48 Claims, 1 Drawing Sheet

US 8,236,723 B2

SELECTIVE CATALYSTS FOR NAPHTHA HYDRODESULFURIZATION

FIELD OF THE INVENTION

This invention relates to a catalyst for hydrodesulfurizing naphtha, to a method for preparing said catalyst and to a method for hydrodesulfurizing naphtha using said catalyst. More particularly, the catalyst comprises a Co/Mo metal hydrogenation component on a silica support having a defined pore size distribution and at least one organic additive. The catalyst has high dehydrosulphurisation activity and minimal olefin saturation when used to hydrodesulfurize naphtha.

BACKGROUND OF THE INVENTION

Environmental regulations mandate the lowering of sulfur levels in motor gasoline (mogas). For example, it is expected that regulations will require mogas sulfur levels of 30 ppm or less by 2006. In many cases, these sulfur levels will be achieved by hydrotreating naphtha produced from Fluid Catalytic Cracking (FCC cat naphtha), which is the largest contributor to sulfur in the mogas pool. Since sulfur in mogas can also lead to decreased performance of catalytic converters, a 30 ppm sulfur target is desirable even in cases where regulations would permit a higher level. As a result, techniques are required that reduce the sulfur in cat naphthas while at the same time minimizing the reduction of beneficial properties such as octane number.

Conventional fixed bed hydrotreating can reduce the sulfur level of cracked naphthas to very low levels: However, such hydrotreating also results in significant octane number loss due to extensive reduction of the olefin content in the naphtha as well as excessive consumption of hydrogen during the hydrotreating process. Selective hydrotreating processes have recently been developed to avoid such olefin saturation and octane number loss. Unfortunately, in such processes, the liberated $H_2S$ reacts with retained olefins forming mercaptan sulfur by reversion. Unfortunately, the $H_2S$ liberated in the process reacts with retained olefins forming mercaptan sulfur by reversion. Such processes can be conducted at severities which produce product within sulfur regulations. However, significant octane number loss also occurs.

One proposed approach for preserving octane number during sulfur removal is to modify the olefin content of the feed using an olefin-modification catalyst followed by contact with an HDS catalyst (U.S. Pat. No. 6,602,405). The olefin modification catalyst oligomerizes the olefins.

One recently developed method of HDS is SCANfining which is a process developed by Exxon Mobil Corporation. SCANfining is described in National Petroleum Refiners Association paper #AM-99-31 titled "Selective Cat Naphtha Hydrofining with Minimal Octane Loss" and U.S. Pat. Nos. 5,985,136 and 6,013,598. Typical SCANfining conditions include one and two-stage processes for hydrodesulfurizing a naphtha feedstock. The feedstock is contacted with a hydrodesulfurization catalyst comprised of about 1 wt. % to about 10 wt. % $MoO_3$; and about 0.1 wt. % to about 5 wt. % CoO; and a Co/Mo atomic ratio of about 0.1 to about 1.0; and a median pore diameter of about 60 Å to about 200 Å.

Even though SCANfining controls the degree of olefin saturation while achieving a high degree of HDS, there is still a need to improve the selectivity of the catalyst system to further reduce the degree of olefin saturation thereby further minimizing octane number loss whilst at the same time achieving a high hydrodesulfurization activity.

SUMMARY OF THE INVENTION

This invention relates to a catalyst for hydrodesulfurizing naphtha, to a method for preparing said catalyst and to a method for hydrodesulfurizing naphtha using said catalyst. One embodiment relates to a method for making a catalyst for the hydrodesulfurisation (HDS) of naphtha, the method comprising:

(i) impregnating a silica support that has a silica content of at least about 85 wt. %, based on silica, and has a pore volume between about 0.6 cc/g and about 2.0 cc/g, and median pore sizes in the range of about 150 Å to 2000 Å with (a) an aqueous solution of a cobalt salt, (b) an aqueous solution of a molybdenum salt and (c) at least one organic additive, said organic additive comprising at least one compound selected from the group consisting of compounds comprising at least two hydroxyl groups and 2-20 carbon atoms, and the (poly) ethers of these compounds, to form a catalyst precursor;

(ii) drying the catalyst precursor at a temperature of less than about 350° C. to form a dried catalyst precursor; and (iii) optionally sulfiding the dried catalyst precursor, provided that the dried catalyst precursor or catalyst is not calcined prior to sulfiding or use for HDS.

This method is referred to as the direct preparation process. The impregnation of the Co salt, the Mo salt and the organic additive(s), may be done in more than one consecutive step in various order and combinations. The dried catalyst precursor is "optionally" sulfided. The invention thus relates both to the process for making the dried catalyst precursor in unsulfided form, as this is the form in which the catalyst is usually made commercially available, but also to the process for making a catalyst in its active sulfided form. The expression "catalyst precursor" as used throughout the description is used to refer to a catalyst in unsulfided form, as sulfidation is typically performed before use in HDS. Use of this expression however does not exclude the fact that the unsulfided form of the catalyst also has catalytic properties.

In another embodiment, the present invention relates to a method for making a catalyst for the hydrodesulfurisation (HDS) of naphtha, the method comprising:

(i) impregnating a silica support that has a silica content of at least about 85 wt. %, based on silica, and has a pore volume between about 0.6 cc/g and about 2.0 cc/g, and median pore sizes in the range of about 150 Å to 2000 Å with (a) an aqueous solution of a cobalt salt and (b) an aqueous solution of a molybdenum salt to form a first catalyst precursor;

(ii) drying the first catalyst precursor at a temperature of less than about 350° C. to form a first dried catalyst precursor;

(iii) impregnating the first dried catalyst precursor with (c) at least one organic additive, the organic additive comprising at least one compound selected from the group consisting of compounds comprising at least two hydroxyl groups and 2-20 carbon atoms, and the (poly)ethers of these compounds, to form a second catalyst precursor;

(iv) optionally drying the second catalyst precursor at a temperature of less than about 350° C. to form a second dried catalyst precursor and (v) optionally sulfiding the second dried catalyst precursor, provided that the second dried catalyst precursor is not calcined prior to sulfiding or use for HDS.

This method is referred to as the post-impregnation or activation process because the impregnation with the additives may be applied to any commercially available or prepared catalyst not comprising an additive and that has not yet been sulphided.

In yet another embodiment, the invention relates to a method for making a catalyst for the hydrodesulfurisation (HDS) of naphtha, the method comprising:

(i) regenerating a spent catalyst comprising a silica support that has a silica content of at least about 85 wt. %, based on silica, and has a pore volume between about 0.6 cc/g and about 2.0 cc/g, and median pore sizes in the range of about 150 Å to 2000 Å, into which a cobalt salt and a molybdenum salt have been impregnated, to form a regenerated catalyst (ii) impregnating the, regenerated catalyst with at least one organic additive, said organic additive comprising at least one compound selected from the group consisting of compounds comprising at least two hydroxyl groups and 2-20 carbon atoms, and the (poly)ethers of these compounds, to form a catalyst precursor;

(iii) optionally drying the catalyst precursor at a temperature of less than about 350° C. to form a dried catalyst precursor; and (iv) optionally sulfiding the dried catalyst precursor, provided that the dried catalyst precursor or catalyst is not calcined prior to sulfiding or use for HDS.

This method is referred to as the reactivation process because the impregnation with the additives may be applied to a regenerated (spent) catalyst for the hydrodesulfurisation (HDS) of naphtha as specified, most preferably a catalyst that before use in HDS had been prepared with the method according to the present invention.

In another embodiment, the invention relates to a catalyst comprising a silica support that has a silica content of at least about 85 wt. %, based on silica, and has a pore volume between about 0.6 cc/g and about 2.0 cc/g, and median pore sizes in the range of about 150 Å to 2000 Å, said silica support having impregnated therein a cobalt salt, a molybdenum salt and at least one organic additive, said organic additive comprising at least one compound selected from the group consisting of compounds comprising at least two hydroxyl groups and 2-20 carbon atoms, and the (poly)ethers of these compounds. In particular the invention relates to such catalyst obtainable by any of the above described methods according to the invention.

The invention further also relates to a catalyst according to the invention that has been sulphided by in-situ or ex-situ sulphidation.

Another embodiment relates to a method for the HDS of naphtha having an olefin content of at least about 5 wt. %, based on the weight of the naphtha comprising: (i) contacting the naphtha with a selective HDS catalyst under hydrodesulfurization conditions, wherein the selective HDS catalyst is prepared by any of the above described methods.

The catalyst of the invention, when used for the HDS of a naphtha, shows improved selectivity towards olefin saturation while maintaining a high level of HDS of the naphtha feed.

DETAILED DESCRIPTION OF THE INVENTION

Figure 1:
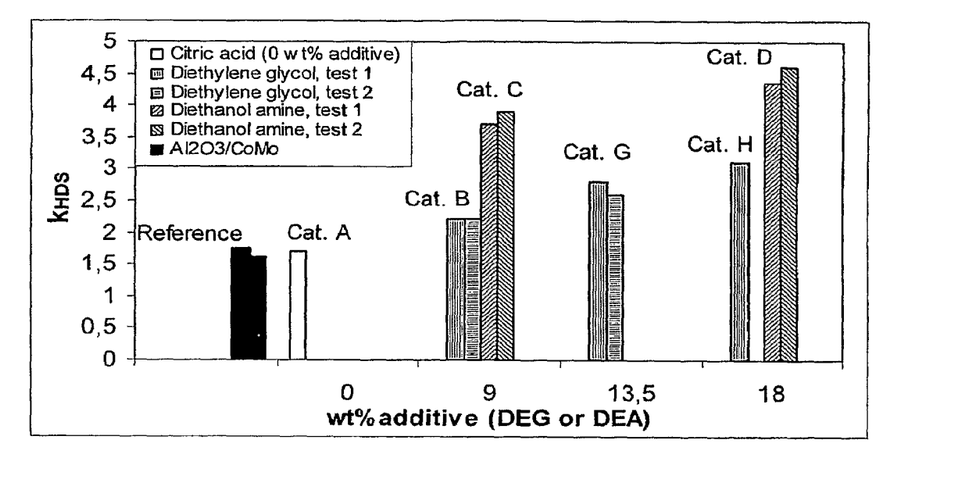
FIG. 1 is a graph showing the HDS activity ($k_{HDS}$) as a function of the amount (wt %) of organic additive for different additives compared to an alumina supported catalyst.

The term "naphtha" refers to the middle boiling range hydrocarbon fraction or fractions that are major components of gasoline, while the term "FCC naphtha" refers to preferred naphtha that has been produced by the well known process of fluid catalytic cracking. Naphtha's having a middle boiling range are those having boiling points from about 10° C. (i.e., from about $C_5$) to about 232° C. (50 to 450° F.) at atmospheric pressure, preferably from about 21° C. to about 221° C. (70 to 430° F.). Producing naphtha in an FCC process without added hydrogen results in a naphtha that is relatively high in olefins and aromatics. Other naphthas such as steam cracked naphthas and coker naphthas may also contain relatively high concentrations of olefins. Typical olefinic naphthas have olefin contents of at least about 5 wt. % up to about 60 wt. %, based on the weight of the naphtha, preferably about 5 wt. % to about 40 wt. %; sulfur contents from about 300 ppmw to about 7000 ppmw, based on the weight of the naphtha; and nitrogen contents from about 5 ppmw to about 500 ppmw, based on the weight of the naphtha. Olefins include open chain olefins, cyclic olefins, dienes and cyclic hydrocarbons with olefinic side Chains. Because olefins and aromatics are high octane number components, olefinic naphtha generally exhibits higher research and motor octane values than does hydrocracked naphtha. While olefinic naphthas are typically high in olefin content, they may also contain other compounds, especially sulfur-containing and nitrogen-containing compounds.

The catalyst for the selective removal of sulfur with minimal olefin saturation from an olefinic naphtha is a silica supported catalyst that has been impregnated with (a) a cobalt salt, (b) a molybdenum salt, and (c) at least one organic additive. The silica support contains at least about 85 wt. % silica, based on silica support, preferably at least about 90 wt. % silica, especially at least about 95 wt. % silica. Examples of silica supports include silica, MCM-41, silica-bonded MCM-41, fumed silica, metal oxide modified siliceous supports and diatomaceous earth.

The silica support has a pore volume between about 0.6 $cm^3/g$ and about 2.0 $cm^3/g$, preferably between about 0.8 $cm^3/g$ and about 1.0 $cm^3/g$, as determined by mercury intrusion porosimetry, according to the ASTM D4284-03 method. Also, the silica support has median pore sizes (median pore diameters) in the range from about 150 Angstroms to about 2000 Angstroms, preferably from about 150 Angstroms to about 1000 Angstroms, more preferably from about 200 Angstroms to about 500 Angstroms, as measured by mercury porosimetry, according to the ASTM D4284-03 method.

Preferred silica carriers have one or several of the following features:
(i) a surface area determined b' nitrogen adsorption using the BET equation in the range of from 50 to 150 $m^2/g$, preferably in the range from 60 to 140 $m^2/g$;
(ii) a crush strength of at least 625 g/mm (35 lb/in), preferably in the range between 625 g/mm (35 lb/in) and 2144 g/mm (120 lb/in).

In a separate preferred embodiment, the carrier further comprises up to 10 parts by weight, preferably up to 5 parts by weight, of a polymeric material per 100 parts by weight of carrier: Conveniently, the organic material is a polymeric material, for example an organic material selected from polyvinyl alcohols, cellulose, cellulose ethers, such as methylcellulose and hydroxypropyl methyl cellulose polymers, colloidal silica, floridin, carbon powder, graphite, polyoxyethylene, mixed walnut shell or a mixture thereof. In this preferred embodiment, the silica carrier is conveniently prepared by a method comprising the steps of (a) shaping particles from a mixture obtained from at least one silica source, a liquid medium and at least one of the aforementioned polymeric materials; (b) drying the shaped particles obtained in step (a), preferably at a temperature of less than 200° C.; and (c) heating the shaped particles to a temperature in the range of from about 500° C. to about 800° C. in the presence of steam or a mixture of steam and air. Step (c) is conveniently carried out in an atmosphere containing at least 5 vol. % air or in an atmosphere containing at least 10 vol. % steam. Also conveniently, the mixture that is shaped in step (a) is obtained by combining at least one silica powder and at least one silica sol.

While not wishing to be bound to any particular theory, it is postulated that silica supports with large pore sizes and large pore diameters, when combined with the at least one organic additives according to the invention, lead to HDS catalysts having the desired selectivity towards olefin saturation while maintaining the activity of the HDS catalyst for desulfurizing the naphtha feed.

In another embodiment, the silica support may also be doped with metals from Groups 2-4 of the Periodic Table based on the IUPAC format having Groups 1-18, preferably from Groups 2 and 4. Examples of such metals include Zr, Mg, Ti. See, e.g., The Merck Index, Twelfth Edition, Merck & Co., Inc., 1996.

The cobalt and molybdenum salts used to impregnate the silica support may be any water-soluble salts. Preferred salts include carbonates, nitrates, heptamolybdate and the like. The expression "water soluble cobalt and molybdenum salts" here also implies those cobalt and molybdenum compounds that may not be soluble in pure water, but are soluble in the aqueous impregnation solution, for example because of the presence of an acid, for example cobalt and/or molybdenum oxides in combination with an acid. The amount of salt is such that the silica support will contain from about 2 wt. % to about 8 wt. %, preferably from about 3 wt. % to about 6 wt. % cobalt oxide, based on catalyst and from about 8 wt. % to about 30 wt. %, preferably from about 10 wt. % to about 25 wt. % molybdenum oxide, based on support.

The organic additive used for impregnation is at least one compound selected from the group consisting of compounds comprising at least two hydroxyl groups and 2-20 carbon atoms, preferably 2-15 carbon atoms and more preferably 2-10 carbon atoms and the (poly)ethers of these compounds. In general very good results were found when the organic additive is chosen from the group consisting of polyhydroxyalkanes or polyhydroxyalkenes comprising two or more hydroxyl groups and between 1 and 4 carbon atoms per hydroxyl group and polycondensates (polyethers) thereof.

Examples of suitable additives include aliphatic alcohols such as ethylene glycol, propylene glycol, glycerin, trimethylol ethane, trimethylol propane, etc. Ethers of these compounds include diethylene glycol, dipropylene glycol, trimethylene glycol, triethylene glycol, tributylene glycol, tetraethylene glycol, tetrapentylene glycol. These compounds also include polyethers such as polyethylene glycol. Other ethers which are suitable for use in the present invention include ethylene glycol monobutyl ether, diethylene glycol monomethyl ether, diethylene glycol monoethyl ether, diethylene glycol monopropyl ether, and diethylene glycol monobutyl ether. Of these, ethylene glycol, diethylene glycol, triethylene glycol, tetraethylene glycol, proplylene glycol, dipropylene glycol, and polyethylene glycol with a molecular weight between 200 and 600 are preferred.

Another group of compounds comprising at least two hydroxyl groups and 2-10 carbon atoms per molecule are the saccharides. Preferred saccharides include monosaccharides such as glucose and fructose. Ethers thereof include disaccharides such as lactose, maltose, and saccharose. Polyethers of these compounds include the polysaccharides. The organic compounds of this group are preferably substantially saturated, as is evidenced by an Iodine number of less than 60, preferably less than 20.

In an even more preferred embodiment, the compound comprising two hydroxyl groups and having 2-20 carbon atoms, preferably 2-15 carbon atoms and more preferably 2-10 carbon atoms, further comprises at least one secondary amine group. Preferably, the at least 2 hydroxyl groups are separated from the secondary amine group by 1 or more carbon atoms, preferably by 2 to 4 carbon atoms.

In general very good results were found when the organic additive is chosen from the group consisting of secondary amines comprising alkanol or alkenol groups and polycondensates thereof, for example, di-ethanolamine or a dialkanoldiamine. One of the advantages of the abovementioned preferred organic additives over catalysts that do not have the additives is that the HDS activity is very high whilst maintaining a high selectivity and hence low olefin saturation. Another non-limiting advantage is that a same good HDS activity and high selectivity can be obtained using a significantly lower metal content, making the catalyst considerably less expensive. It was found that catalyst according to the invention have a comparable activity level at metal content reduced by at least 20%, preferably at least 30% and most preferably at least 40% compared to the same catalyst not having said additives.

The mole ratio between the amount of additive and the amount of hydrogenation metals (combined amounts of Co and Mo) is preferably 0.01:1 to 2.5:1. In view of achieving increased activity, the mole ratio preferably is at least 0.05, more preferably at least 0.1, even more preferably at least 0.2 and most preferably at least 0.3. At high additive to metal ratios the additional activity increase is reduced, so the mole ratio of additive to metals is preferably less than 2.5. The amount of additive(s) is at least 3 wt %, preferably at least 5 wt %, more preferably at least 7 wt % relative to the total weight of the catalyst. Smaller amount of additives are required for additives that are better in improving the activity.

The organic additive preferably has a not too low boiling point, preferably in the range of 80-500° C. and a good solubility in water, typically of at least 5 grams per liter at room temperature (20° C.) (atmospheric pressure).

After impregnation of the at least one organic additive, it is essential to the method according to the invention that any drying step is effected in such a manner that at least part of the additive remains in the catalyst. The catalyst is hence not calcined after impregnation of the at least one organic additive. In consequence, the drying conditions to be applied depend on the temperature at which the specific additive boils or decomposes. In the context of the present invention, the drying step should be carried out under such conditions that at least 50%, preferably at least 60%, more preferably at least 70%, most preferably at least 90% of the additive incorporated into the catalyst in the impregnation step is still present in the catalyst after the drying step. Of course, it is preferred to keep as much additive as possible in the catalyst during the drying step, but with the more volatile compounds, evaporation during the drying step cannot always be avoided. The drying step may, e. g., be carried out in air, under vacuum, or in inert gas. Generally, it is advantageous to have a drying temperature below about 350° C., such as below about 300° C., conveniently below about 250° C., most preferably below about 200°.

In a particularly preferred embodiment the at least one organic additive further comprises an inorganic acid, an organic acid or a mixture of an inorganic acid and an organic acid. Inorganic acids are defined as acidic components which do not contain a carbon atom. Examples of inorganic acids include HCl, $H_2SO_4$, $HNO_3$, $H_3PO_4$, $(NH_4)H_2PO_4$, $(NH_4)_2HPO_4$, $H_2PHO_3$, $H_2P_2H_2O_5$, and $H_{(n+2)}P_nO_{(3n+1)}$. Within the group of inorganic acids, the phosphorus-containing acids are preferred, since phosphorus in itself can positively influence the activity of a hydrotreating catalyst. $H_3PO_4$ is particularly preferred.

One disadvantage to the use of inorganic acids is that the counterion, e. g., chloride, sulfate, or nitrate, is incorporated into the catalyst composition. If the additive impregnation process of the present invention is repeated a number of times this may lead to an undesirable build-up of these counterions in the catalyst composition. However, depending on the nature of the counterion and on the number of addition impregnation steps envisaged, this may not be a problem. Organic acids are preferred because they do not have said disadvantage.

In the context of the present specification, an organic acid is defined as a compound comprising at least one carboxylic group (COOH). The organic acid is generally a carboxylic acid comprising at least one carboxyl group and 1-20 carbon atoms (carbon atoms in the carboxyl group included). Suitable acids include acetic acid, citric acid, malic acid, maleic acid, formic acid, glycolic acid, hydroxypropionic acid, hydroxybutyric acid, hydroxyhexanoic acid, tartaric acid, glyceric acid, gluconic acid, oxalic acid, malonic acid, polyacrylic acid, ascorbic acid, and N-containing acids like EDTA and CyDTA (1,2,-cyclohexanediaminetetra-acetic acid) etc. Within this group, compounds comprising at least two carboxylic groups are preferred. For combined costs and activity, citric acid, malic acid, maleic acid, malonic acid, and tartaric acid are preferred. Citric acid is particularly preferred.

In a preferred embodiment the at least one organic additive comprises an organic acid and at least one compound selected from the group consisting of polyhydroxyalkanes or polyhydroxyalkenes comprising 2 or more hydroxyl groups and between 1 and 4 carbon atoms per hydroxyl group, polycondensates thereof and secondary amines comprising alkanol or alkenol groups and polycondensates thereof.

The acid and the additive may be incorporated into the catalyst simultaneously or sequentially in; no particular order. An advantage of incorporating the acid and the additive into the catalyst in separate steps may be that the properties of the impregnation solutions may be tailored to meet the requirements of the acid and the additive. Nevertheless, for reasons of efficiency, it is preferred to contact the support with a single impregnation solution comprising both the acid and the additive, optionally followed by an aging step and/or a drying step under such conditions that at least 50% of the additives remains in the catalyst.

Silica supports are impregnated with aqueous solutions of Co and Mo salts using conventional techniques. The at least one organic additive may be added to one or both of the aqueous solution of Co and Mo salts prior to contact with the silica support. One embodiment for impregnating the silica support with metal salt is by the incipient wetness method. In this method, an aqueous solution containing metal salts and organic additive is mixed with the support up to the point of incipient wetness using conventional techniques, i.e., techniques that are well known in the art of hydroprocessing catalyst preparation, manufacture, and use.

An alternative manner of impregnation of the silica support by metal salt may be by impregnating the silica support with a mixture of a cobalt salt and using incipient wetness, drying the impregnated support and then impregnating the dried support with a molybdenum salt solution or a molybdenum salt solution up to the point of incipient wetness, wherein the Co and/or the Mo salt solution contain some or all of the organic additive(s). In another embodiment, the order of impregnation by cobalt salt followed by molybdenum salt may be reversed. In yet another embodiment, the support may be co-impregnated with a mixture of cobalt salt and molybdenum salt plus organic additive to incipient wetness. The co-impregnated support may be dried and the co-impregnation process repeated.

In yet another embodiment, an extruded silica support is impregnated with a mixture of cobalt salt, molybdenum salt and organic additive and the impregnated support dried. This treatment may be repeated if desired.

In yet another embodiment, the silica support is impregnated with an aqueous solution of a cobalt salt and an aqueous solution of a molybdenum salt, or a solution of a cobalt salt and a molybdenum salt to form a first catalyst precursor. The first catalyst precursor is dried, and the at least one organic additives are then impregnated on the first dried catalyst precursor to form a second catalyst precursor.

In all the above embodiments, the organic additive may be a single additive or may be a mixture of additives, and the impregnation sequences may be repeated several times if necessary to achieve the desired metal and additive loadings. After impregnation, heating and drying are carried out at temperatures in the range from about 50° C. to about about 350° C., preferably below about 300° C., to form a dried catalyst precursor. The drying may be under vacuum, or in air, or inert gas such as nitrogen. The conditions of temperature applied are typically chosen to allow drying while minimizing additive loss by evaporation.

As indicated before, it is important that at least a part of the organic additives impregnated in the catalyst remain in the catalyst before the catalyst is used in a catalytic process. For this reason, the catalyst is not heated to temperatures greater than about 350° C. before catalytic use. However, due to catalyst deactivation during its catalytic use, the catalyst will require regeneration. Catalyst regeneration can be carried out by any method known to those skilled in art. For the catalysts according to the invention preferred regeneration conditions consist of contacting the spent catalyst with oxygen containing gas at temperatures below about 350° C., preferably below about 325° C., more preferably below about 315° C. and most preferably below about 300° C. The regeneration temperature is typically chosen as low as possible, while avoiding long regeneration times. Regeneration temperatures ranging from 310° C. to 340° C. are usually convenient for these types of catalysts.

Unfortunately, regeneration conditions can sometimes lead to removal of most if not all of the organic additive necessary for optimal catalyst performance. The present invention thus also relates to a method for making a catalyst, in which a spent catalyst that has been submitted to regeneration is re-impregnated with the at least one organic additive, or even re-submitted to any of the aforementioned impregnation methods.

In a separate embodiment, the present invention also relates to a method for making a catalyst for the hydrodesulfurisation (HDS) of naphtha, the method comprising: (i) regenerating a spent catalyst comprising a silica support that has a silica content of at least about 85 wt. %, based on silica, and has a pore volume between about 0.6 cc/g and about 2.0 cc/g, and median pore sizes in the range of about 150 Å to 2000 Å, into which a cobalt salt and a molybdenum salt have been impregnated, to form a regenerated catalyst, (ii) impregnating the regenerated catalyst with at least one organic additive, said organic additive comprising at least one compound selected from the group consisting of compounds comprising at least two hydroxyl groups and 2-20 carbon atoms, and the (poly)ethers of these compounds, to form a catalyst precursor; (iii) drying the catalyst precursor at a temperature of less than about 350° C. to form a dried catalyst precursor; and (iv) optionally sulfiding the dried catalyst precursor, provided that the dried catalyst precursor or catalyst is not calcined prior to sulfiding or use for HDS. In this embodiment, the spent catalyst does not necessarily need to have been impregnated with the at least one organic additive before catalytic use, but preferably also is a catalyst according to the invention.

As previously indicated, the invention provides catalysts that are particularly useful as hydrodesulfurization catalyst. For such catalytic use, the dried catalyst precursors typically undergo a sulfurization step before catalytic use. When such sulfurization is carried out, the dried catalyst precursor is treated with hydrogen sulfide at concentrations of from about 0.1 vol. % to about 10 vol. % based on total volume of gases present, for a period of time and at a temperature sufficient to convert metal oxide, metal salt or metal complex to the corresponding sulfide in order to form the HDS catalyst. The hydrogen sulfide may be generated by a sulfiding agent incorporated in or on the catalyst precursor. In an embodiment, the sulfiding agent is combined with a diluent. For example, dimethyl disulfide can be combined with a naphtha diluent. Lesser amounts of hydrogen Sulfide may be used, but this may extend the time required for activation. An inert carrier may be present and activation may take place in either the liquid or gas phase. Examples of inert carriers include nitrogen and light hydrocarbons such as methane. When present, the inert gases are included as part of the total gas volume. Temperatures are in the range from about 150° C. to about 700° C., preferably about 160° C. to about 343° C. The temperature may be held constant or may be ramped up by starting at a lower temperature and increasing the temperature during activation. Total pressure is in the range up to about 5000 psig (34576 kPa); preferably about 0 psig to about 5000 psig (101 to 34576 kPa), more preferably about 50 psig to about 2500 psig (446 to 17338 kPa). If a liquid carrier is present, the liquid hourly space velocity (LHSV) is from about 0.1 $hr^{-1}$ to about 12 $hr^{-1}$, preferably about 0.1 $hr^{-1}$ to about 5 $hr^{-1}$. The LHSV pertains to continuous mode. However, activation may also be done in batch mode. Total gas rates may be from about 89 $m^3/m^3$ to about 890 $m^3/m^3$ (500 to 5000 scf/B).

Catalyst sulfiding may occur either in situ or ex situ. Sulfiding may occur by contacting the catalyst with a sulfiding agent, and can take place with either a liquid or gas phase sulfiding agent. Alternatively, the catalyst may be presulfurized such that $H_2S$ may be generated during sulfiding. In a liquid phase sulfiding agent, the catalyst to be sulfided is contacted with a carrier liquid containing sulfiding agent. The sulfiding agent may be added to the carrier liquid or the carrier liquid itself may be sulfiding agent. The carrier liquid is preferably a virgin hydrocarbon stream and may be the feedstock to be contacted with the hydroprocessing catalyst but may be any hydrocarbon stream such as a distillate derived from mineral (petroleum) or synthetic sources. If a sulfiding agent is added to the carrier liquid, the sulfiding agent itself may be a gas or liquid capable of generating hydrogen sulfide under activation conditions. Examples include hydrogen sulfide, carbonyl sulfide, carbon disulfide, sulfides such as dimethyl sulfide, disulfides such as dimethyl disulfide, and polysulfides such as di-t-nonylpolysulfide. The sulfides present in certain feeds, e.g., petroleum feeds, may act as sulfiding agent and include a wide variety of sulfur-containing species capable of generating hydrogen sulfide, including aliphatic, aromatic and heterocyclic compounds.

Following sulfiding, the catalyst may be contacted with naphtha under hydrodesulfurizing conditions. Hydrodesulfurizing conditions include temperatures of from about 150° C. to about 400° C., pressures of from about 445 kPa to about 13890 kPa (50 to 2000 psig), liquid hourly space velocities of from about 0.1 to about 12 and treat gas rates of from about 89 $m^3/m^3$ to about 890 $m^3/m^3$ (500 to 5000 scf/B). After hydrodesulfurization, the desulfurized naphtha can be conducted away for storage or further processing, such as stripping to remove hydrogen sulfide. The desulfurized naphtha is useful for blending with other naphtha boiling-range hydrocarbons to make mogas.

Selected embodiments, including preferred embodiments, are illustrated in the following examples.

EXAMPLE 1 (COMPARATIVE)

A silica support was prepared using 80 wt % Ultrasil VN3SP $SiO_2$ powder and 20 wt % Nyacol 2034 DI aqueous colloidal silica sol, both based on the dry weight of the support after treatment at 600° C. These silica sources were mixed together with 4 wt % polyvinyl alcohol (PVA) based on the dry silica mixture with an OH number of 78-82 mole %, which was pre-mixed with water to form an aqueous solution. Additional water was added as required to form an extrudable mixture. The mixture was extruded to form 1.3 mm quadrulobe particles. The extrudates were dried at 120° C. for about 1 hour. The dried support was calcined at 790° C. in an environment of 25 wt % steam in air for about 1 hour.

The catalyst support had a total pore volume of 0.91 ml/g as measured by mercury intrusion porosimetry, according to the ASTM D 4284-03 method, assuming a contact angle of 130° for mercury on silica, using a Micromeritics AutoPore IV 9500 instrument, a BET surface area of 80 $m^2/g$, a median pore diameter as calculated from the aforementioned mercury intrusion volume measurements of 445 Å, and a crush strength of 72 lb/in.

A CoMo-CA solution was prepared using 30.9 g $CoCO_3$ (44.5 wt % Co), 70.0 g $MoO_3$ and 24.7 g citric acid. The volume was adjusted to 300 g $MoO_3$/1.75 g of the prepared silica support was impregnated using the incipient wetness method so that the product would contain 20 wt % $MoO_3$ and 5 wt % CoO based on the dry weight of the catalyst after treatment at 600° C. An aliquot of 66.7 ml of the prepared metal solution was diluted with 9.7 ml water to equal 105% of the pore volume of the substrate. The impregnated catalyst was aged for 1 hr. The catalyst was dried to a product temperature of 50° C. using dry air of 90° C. The final product was removed from the vessel and stored in a closed vessel under air. This catalyst sample will further be denoted as catalyst A.

A fixed reactor volume was loaded with the prepared catalyst, which was sulfided using 3% $H_2S$ in $H_2$ and virgin naphtha under sulfiding conditions. The hydrodesulfurization and the olefin saturation performance of the silica supported CoMo catalyst were evaluated on an FCC naphtha feed with an initial boiling point of 10° C. and a final boiling point of 177° C. containing 1408 ppm sulfur and 46.3 wt % olefins, based on the weight of the feed. The performance test was executed at a temperature of 274° C. (525° F.) at a pressure of 220 psig using $H_2$. Feed flow rate was adjusted to obtain a range of 2-methylthiophene desulfurization from 65 wt % to 99 wt %, based on the weight of the feed. Product streams were analyzed using on-line gas chromatography (GC) and sulfur chemiluminescence detection (SCD). C5 olefin content in the product was compared with C5 olefin content in the feed on a weight basis to calculate the percentage of olefin saturation (% OS). Results were stable after about 30 hrs of catalyst on stream, and were used to evaluate the olefin saturation at various HDS conversions (% HDS)

The HDS activity of catalyst A was evaluated by calculation of the 1.5 order reaction rate constant for the 2-methyl thiophene desulfurization reaction. This calculation was done for all feed flow rates that were applied. The performance was compared to the performance of the commercially available RT225 naphtha hydrodesulfurization catalyst. This is an alumina supported catalyst containing 4.3 wt % $MoO_3$ and 1.2 wt % CoO based on the dry weight of the catalyst. In the preparation no organic additive is used as described in this invention. This catalyst showed a reaction rate constant of 1.77. The ratio of the reaction orders of catalyst A and the commercial $Al_2O_3$/CoMo catalyst expresses the relative catalyst HDS activity. For the $SiO_2$/CoMo catalyst of this example, prepared using citric acid as organic additive the reaction rate constant was 1.72 and the relative HDS activity was 97%. Results of the performance test are shown in table 1.

At 90% HDS conversion, there was about 8.4 wt % OS for the CoMo/$SiO_2$ catalyst described in this example. This is much less than the 13.3 wt % OS that the commercial CoMo/$Al_2O_3$ catalyst showed.

These results show that the silica supported CoMo catalyst with citric acid as organic additive shows a reduced olefin saturation at 90% HDS conversion and that the 1.5 order HDS reaction constant of this catalyst containing 20 wt % $MoO_3$ and 5 wt % CoO on dry basis is almost equal to the 1.5 order HDS reaction constant of the reference alumina supported CoMo catalyst containing 4.3 wt % $MoO_3$ and 1.2 wt % CoO on dry basis,.

EXAMPLE 2

Catalyst B was prepared and tested according to the procedure described in Example 1 with the exception that besides citric acid a second organic additive was added to the metal solution before impregnation. The impregnation solution thus consisted of 66.7 ml CoMo-CA solution, 8.1 g (=7.4 ml) diethylene glycol (DEG) and 2.3 ml water.

The olefin saturation at 90% HDS conversion was 8.3 wt %, while the relative catalyst activity versus the CoMo/$Al_2O_3$ reference catalyst was 135%. This shows that the addition of diethylene glycol to the impregnation solution increases the relative catalyst HDS activity while maintaining the improved olefin saturation performance of catalyst A.

EXAMPLE 3

Catalyst C was prepared and tested according to the procedure described in Example 1 with the exception that besides citric acid a second organic additive was added to the metal solution before impregnation. The impregnation solution thus consisted of 66.7 ml CoMo-CA solution and 10 g (=9.2 ml) diethanol amine (DEA) and no additional water.

The olefin saturation at 90% HDS conversion was 8.0 wt %, while the relative catalyst activity versus the CoMo/$Al_2O_3$ reference catalyst was 238%. This shows that the addition of diethanol amine to the impregnation solution strongly increases the relative catalyst HDS activity while maintaining the improved olefin saturation performance of catalyst A.

EXAMPLE 4

Catalyst D was prepared and tested according to the procedure described in Example 3 with the exception that the amount of diethanol amine that was added to the metal solution was increased. The impregnation solution now consisted of 66.7 ml CoMo-CA solution and 16.4 g (=15.0 ml) diethanol amine (DEA) and no additional water. The total volume of the impregnation solution equaled 112% of the total pore volume of the support.

The olefin saturation at 90% HDS conversion was 8.0 wt %, while the relative catalyst activity versus the CoMo/$Al_2O_3$ reference catalyst was 282%. This shows that the increased addition of diethanol amine to the impregnation solution even further increases the relative catalyst HDS activity while maintaining the improved olefin saturation performance of catalyst A and C.

EXAMPLE 5

Catalyst E was prepared and tested according to the procedure described in Example 3 with the exception that the amount of metal solution and diethanol amine were reduced to obtain a lower $MoO_3$, CoO, citric acid and diethanol amine content on the catalyst. The relative ratio of these components was kept the same. Additional water was added to maintain the pore volume saturation level. The impregnation solution now consisted of 49.6 ml CoMo-CA solution, 8.0 g (=7.3 ml) diethanol amine (DEA) and 18 ml water, such that the dried catalyst would contain 16 wt % $MoO_3$ and 4 wt % CoO.

The olefin saturation at 90% HDS conversion was 8.6 wt %, while the relative catalyst activity versus the CoMo/$Al_2O_3$ reference catalyst was 145%. This shows that lowering the metal content from 20/5 wt % $MoO_3$/CoO in catalyst C to 16/4 wt % $MoO_3$/CoO in catalyst E reduces the relative catalyst HDS activity while maintaining the improved olefin saturation performance of catalyst C.

EXAMPLE 6

Catalyst F was prepared and tested according to the procedure described in Example 5 with the exception that the amount of metal solution and diethanol amine were further reduced to obtain a lower $MoO_3$, CoO, citric acid and diethanol amine content on the catalyst. The ratio of these components was kept the same. Additional water was added to maintain the pore volume saturation level. The impregnation solution now consisted of 35.0 ml CoMo-CA solution, 6.0 g (=5.5 ml) diethanol amine (DEA) and 36.3 ml water, such that the dried catalyst would contain 12 wt % $MoO_3$ and 3 wt % CoO.

The olefin saturation at 90% HDS conversion was 8.1 wt %, while the relative catalyst activity versus the CoMo/$Al_2O_3$ reference catalyst was 101%. This shows that lowering the metal content from 16/4 wt % $MoO_3$/CoO in catalyst E to 12/3 wt % $MoO_3$/CoO in catalyst F further reduces the relative catalyst HDS activity while maintaining the improved olefin saturation performance of catalysts C and E.

EXAMPLE 7

Catalyst G was prepared and tested according to the procedure described in Example 2 with the exception that the amount of diethylene glycol that was added to the metal solution was increased. The impregnation solution now consisted of 66.7 ml CoMo-CA solution and 12.6 g (=11.6 ml) diethylene glycol (DEG) and no additional water.

The olefin saturation at 90% HDS conversion was 8.0 wt %, while the relative catalyst activity versus the CoMo/$Al_2O_3$ reference catalyst was 171% This shows that the increased addition of diethylene glycol to the impregnation solution further increases the relative catalyst HDS activity while maintaining the improved olefin saturation performance of catalysts A and B.

EXAMPLE 8

Catalyst H was prepared and tested according to the procedure described in example 7 with the exception that the amount of diethylene glycol that was added to the metal solution was further increased. The impregnation solution now consisted of 66.7 nil CoMo-CA solution and 16.8 g (=15.4 ml) diethylene glycol (DEG) and no additional water. The total volume of the impregnation solution equalled 113% of the total pore volume of the support.

The olefin saturation at 90% HDS conversion was 9.1 wt %, while the relative catalyst activity versus the CoMo/$Al_2O_3$ reference catalyst was 190%. This shows that the further increased addition of diethylene glycol to the impregnation solution even further increases the relative catalyst HDS activity while maintaining the improved olefin saturation performance of catalyst A, B and G.

The results of Examples 1 to 8 are summarized in Table 1.

TABLE 1

| Catalyst | Additive | $MoO_3$ wt % | CoO wt % | % OS at 90% HDS conversion | 1.5 order kHDS | Relative catalyst activity (%) |
|---|---|---|---|---|---|---|
| $Al_2O_3$ ref. | — | 4.3 | 1.2 | 13.3 | 1.64-1.77* | 100 |
| A | CA | 20 | 5 | 8.4 | 1.72 | 97 |
| B | CA + DEG | 20 | 5 | 8.3 | 2.21 | 135 |
| C | CA + DEA | 20 | 5 | 8.0 | 3.91 | 238 |
| D | CA + DEA (2x) | 20 | 5 | 8.0 | 4.62 | 282 |
| E | CA + DEA | 16 | 4 | 8.6 | 2.47 | 145 |
| F | CA + DEA | 12 | 3 | 8.1 | 1.71 | 101 |
| G | CA + DEG (1.5x) | 20 | 5 | 8.0 | 2.81 | 171 |
| H | CA + DEG (2x) | 20 | 5 | 9.1 | 3.11 | 190 |

*kHDS = 1.64 for the test series with catalysts B, C, D, G and H, 1.70 for the test series with catalysts E and F and 1.77 for the series with catalyst A.

The invention claimed is:

1. A method for making a catalyst for the hydrodesulfurisation (HDS) of naphtha, the method comprising:
   (i) impregnating a silica support that has a silica content of at least about 85 wt. %, based on silica, and has a pore volume between about 0.6 cc/g and about 2.0cc/g, and median pore sizes in the range of about 200 Å to 500 Å with (a) an aqueous solution of a cobalt salt, (b) an aqueous solution of a molybdenum salt, at least one organic acid, and at least one organic additive, said organic additive comprising at least one compound selected from the group consisting of compounds comprising at least two hydroxyl groups and 2-20 carbon atoms, and the (poly)ethers of these compounds, to form a catalyst precursor;
   (ii) drying the catalyst precursor at a temperature of less than about 350° C. to form a dried catalyst precursor; and
   (iii) optionally sulfiding the dried catalyst precursor, provided that the dried catalyst precursor or catalyst is not calcined prior to sulfiding or use for HDS;
   wherein the amounts of cobalt salt and molybdenum salts are sufficient to provide a catalyst containing from about 2 wt. % to about 8 wt. % cobalt oxide and about 8 wt. % to about 30 wt. % molybdenum oxide, based on the silica support.

2. The method of claim 1 wherein the compound comprising two hydroxyl groups and 2-20 carbon atoms further comprises at least one secondary amine group.

3. The method of claim 2 wherein the at least 2 hydroxyl groups are separated from the secondary amine group by 1 or more carbon atoms.

4. The method of claim 1 wherein the organic additive is chosen from the group consisting of polyhydroxyalkanes and polyhydroxyalkenes comprising two or more hydroxyl groups and between 1 and 4 carbon atoms per hydroxyl group and polycondensates thereof, and secondary amines comprising alkanol or alkenol groups and polycondensates thereof.

5. The method of claim 1 wherein the additive is at least one compound selected from ethylene glycol, diethylene glycol, polyethylene glycol, di-ethanolamine or a dialkanoldiamine.

6. The method of claim 1 wherein the mole ratio between the amount of additive and the amount of cobalt and molybdenum is in the range of from 0.01:1 to 2.5:1.

7. The method of claim 1 wherein the amount of additive is at least 5 wt % relative to the total weight of the catalyst.

8. The method of claim 1 wherein the silica support has a pore volume between about 1.0 $cm^3$/g and about 1.5 $cm^3$/g.

9. The method of claim 1 wherein the silica support contains at least about 90 wt. % silia.

10. The method of claim 1 wherein the catalyst precursor is sulfided in-situ or ex-situ in the presence of at least one sulfiding agent.

11. The method of claim 10 wherein the suifiding agent is hydrogen sulfide at concentrations of from about 0.1 vol. % to about 10 vol. %, based on total volume of gases present.

12. The method of claim 10 wherein the dried catalyst precursor or sulfided catalyst is not heated to temperatures greater than about 350° C prior to sulfiding or use for HDS.

13. A method for the hydrodesulfurization of naphtha having an olefin content of at least about 5 wt %, based on the weight of naphtha, the method comprising contacting, under hydrodesulfurization conditions, the naphtha with a catalyst prepared by the method of claim 1.

14. A method for making a catalyst for the hydrodesulfurisation (HDS) of naphtha, the method comprising:
   (i) impregnating a silica support that has a silica content of at least about 85 wt. %, based on silica, and has a pore volume between about 0.6 cc/g and about 2.0 cc/g, and median pore sizes in the range of about 200 Å to 500 Å with (a) an aqueous solution of a cobalt salt and (b) an aqueous solution of a molybdenum salt to form a first catalyst precursor;
   (ii) drying the first catalyst precursor at a temperature of less than about 350° C to form a first dried catalyst precursor;
   (iii) impregnating the dried catalyst precursor with (c) at least one organic acid and at least one organic additive, the organic additive comprising at least one compound selected from the group consisting of compounds comprising at least two hydroxyl groups and 2-20 carbon atoms, and the (poly)ethers of these compounds, to form a second catalyst precursor;
   (iv) optionally drying the second catalyst precursor to form a second dried catalyst precursor; and
   (v) optionally sulfiding the second catalyst precursor, provided that the second dried catalyst precursor or catalyst is not calcined prior to sulfiding or use for HDS;
   wherein the amounts of cobalt salt and molybdenum salts are sufficient to provide a catalyst containing from about 2 wt. % to about 8 wt. % cobalt oxide and about 8 wt. % to about 30 wt. % molybdenum oxide, based on the silica support.

15. The method of claim 14 wherein the compound comprising two hydroxyl groups and 2-20 carbon atoms further comprises at least one secondary amine group.

16. The method of claim 15 wherein the at least 2 hydroxyl groups are separated from the secondary amine group by 1 or more carbon atoms.

17. The method of claim 14 wherein the organic additive is chosen from the group consisting of polyhydroxyalkanes and polyhydroxyalkenes comprising two or more hydroxyl groups and between 1 and 4 carbon atoms per hydroxyl group and polycondensates thereof, and secondary amines comprising alkanol or alkenot groups and polycondensates thereof.

18. The method of claim 14 wherein the additive is at least one compound selected from ethylene glycol, diethylene glycol, polyethylene glycol, diethanolamine or a dialkanoldiaraine.

19. The method of claim 14 wherein the mole ratio between the amount of additive and the amount of cobalt and molybdenum is in the range of from 0.01:1 to 2.5:1.

20. The method of claim 14 wherein the amount of additive is at least 5 wt % relative to the total weight of the catalyst.

21. The method of claim 14 wherein the silica support has a pore volume between about 1.0 cm$^3$/g and about 1.5 cm$^3$g.

22. The method of claim 14 wherein the catalyst precursor is sulfided in-situ or ex-situ in the presence of at least one sulfiding agent.

23. The method of claim 22 wherein the sulfiding agent is hydrogen sulfide at concentrations of from about 0.1 vol. % to about 10 vol. %, based on total volume of gases present.

24. The method of claim 14 wherein neither the first nor second dried catalyst precursor is heated to temperatures greater than about 350° C. prior to sulfiding or use for HDS.

25. The method of claim 14 wherein the silica support contains at least about 90 wt. % silica.

26. A method for making a catalyst for the hydrodesulfurisation (HDS) of naphtha, the method comprising:
 (i) regenerating a spent catalyst comprising a silica support that has a silica content of at least about 85 wt. %, based on silica, and has a pore volume between about 0.6 cc/g and about 2.0 cc/g, and median pore sizes in the range of about 200 Å to 500 Å into which a cobalt salt and a molybdenum salt have been impregnated, to form a regenerated catalyst
 (ii) impregnating the regenerated catalyst with at least one organic acid and at least one organic additive, said organic additive comprising at least one compound selected from the group consisting of compounds comprising at least two hydroxyl groups and 2-20 carbon atoms, and the (poly)ethers of these compounds, to form a catalyst precursor;
 (ii) drying the catalyst precursor at a temperature of less than about 350° C to form a dried catalyst precursor, and
 (iii) optionally sulfiding the dried catalyst precursor, provided that the dried catalyst precursor or catalyst is not calcined prior to sulfiding or use for HDS;
 wherein the amounts of cobalt salt and molybdenum salts are sufficient to provide a catalyst containing from about 2 wt. % to about 8 wt. % cobalt oxide and about 8 wt. % to about 30 wt. % molybdenum oxide, based on the silica support.

27. The method of claim 26 wherein the organic additive is chosen from the group consisting of polyhydroxyalkanes and polyhydroxyalkenes comprising two or more hydroxyl groups and between 1 and 4 carbon atoms per hydroxyl group and polycondensates thereof, and secondary amines comprising alkanol or alkenol groups and polycondensates thereof.

28. The method of claim 26 wherein the additive is at least one compound selected from ethylene glycol, diethylene glycol, polyethylene glycol, diethanolamine or a dialkanoldiamine.

29. The method of claim 26 wherein the mole ratio between the amount of additive and the amount of cobalt and molybdenum is in the range of from 0.01:1 to 2.5:1.

30. The method of claim 26 wherein the amount of additive is at least 5 wt % relative to the total weight of the catalyst.

31. The method of claim 26 wherein the silica support has a pore volume between about 1.0 cm$^3$/g and about 1.5 cm$^3$/g.

32. The method of claim 26 wherein the catalyst precursor is sulfided in-situ or ex-situ in the presence of at least one sulfiding agent.

33. The method of claim 32 wherein the sulfiding agent is hydrogen sulfide at concentrations of from about 0.1 vol. % to about 10 vol. %, based on total volume of gases present.

34. The method of claim 26 wherein neither the dried catalyst precursor nor the sulfided catalyst is heated to temperatures greater than about 350° C prior to sulfiding or use for HDS.

35. The method of claim 26 wherein the silica support contains at least about 90 wt. % silica.

36. A catalyst comprising a silica support that has a silica content of at least about 85 wt. %, based on silica, and has a pore volume between about 0.6 cc/g and about 2.0 cc/g, and median pore sizes in the range of about 200 Å to 500 Å, said silica support having impregnated therein a cobalt salt, a molybdenum salt, at least one organic acid and at least one organic additive, said organic additive comprising at least one compound selected from the group consisting of compounds comprising at least two hydroxyl groups and 2-20 carbon atoms, and the (poly)ethers of these compounds; wherein the catalyst contains from about 2 wt. % to about 8 wt. % cobalt oxide and about 8 wt. % to about 30 wt. % molybdenum oxide, based on the silica support.

37. The catalyst of claim 36, wherein the compound comprising two hydroxyl groups and 2-20 carbon atoms further comprises at least one secondary amine group.

38. The catalyst of claim 37 wherein the at least 2 hydroxyl groups are separated from the secondary amine group by 1 or more carbon atoms.

39. The catalyst of claim 36 wherein the organic additive is chosen from the group consisting of polyhydroxyalkanes and polyhddroxyalkenes comprising two or more hydroxyl groups and between 1 and 4 carbon atoms per hydroxyl group and polycondensates thereof, and secondary amines comprising alkanol or alkenol groups and polycondensates thereof.

40. The catalyst of claim 36 wherein the additive is at least one compound selected from ethylene glycol, diethylene glycol, polyethylene glycol, di-ethanolumine or a dialkanoldiamine.

41. The catalyst of claim 36 wherein the mole ratio between the amount of additive and the amount of cobalt and molybdenum is in the range of from 0.01:1 to 2.5:1.

42. The catalyst of claim 36 wherein the amount of additive is at least 5 wt % relative to the total weight of the catalyst.

43. The catalyst of claim 36 wherein the silica support has a pore volume between about 1.0 cc/g and about 1.5 cc/g.

44. The catalyst of claim 36 wherein the silica support contains at least about 90 wt. % silica.

45. The catalyst of claim 36 that has been sulphided by in-situ or ex-situ sulphidation.

46. A method for the hydrodesulfurization of naphtha having an olefin content of at least about 5 wt %, based on the weight of naphtha, the method comprising:
(a) sulfiding a catalyst according to claim 36 to form a sulfided catalyst;
(b) contacting the sulfided catalyst with the naphtha under hydrodesulfurization conditions.

47. The method of claim 46, wherein the naphtha is at least one of FCC naphtha, steam cracked naphtha or coker naphtha.

48. The method of claim 47, wherein the naphtha has an olefin content of from about 5 wt % to about 60 wt %, a nitrogen content of from about 5 ppmw to about 500 ppmw and a sulfur content of from about 300 ppmw to about 7000 ppmw, relative to the weight of naphtha.

* * * * *